United States Patent
Williams et al.

(10) Patent No.: US 9,607,513 B1
(45) Date of Patent: Mar. 28, 2017

(54) SYSTEMS AND METHODS FOR INFORMING DRIVER OF LANE PASSING REGULATIONS

(71) Applicant: DENSO International America, Inc., Southfield, MI (US)

(72) Inventors: Matthew Williams, Royal Oak, MI (US); Takayuki Kimura, Farmington Hills, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 14/958,317

(22) Filed: Dec. 3, 2015

(51) Int. Cl.
  *G08G 1/095* (2006.01)
  *G08G 1/09* (2006.01)
  *G06K 1/00* (2006.01)

(52) U.S. Cl.
  CPC ........ *G08G 1/09* (2013.01); *G06K 1/00* (2013.01)

(58) Field of Classification Search
  CPC .................................... G06K 1/00; B60R 1/00
  See application file for complete search history.

(56) References Cited

U.S. PATENT DOCUMENTS

| | | | |
|---|---|---|---|
| 6,560,529 B1 | 5/2003 | Janssen | |
| 2002/0175831 A1* | 11/2002 | Bergan | G08G 1/095 340/908.1 |
| 2003/0085991 A1* | 5/2003 | Toda | H04N 13/0239 348/42 |
| 2008/0137908 A1* | 6/2008 | Stein | G06K 9/00818 382/103 |
| 2015/0220796 A1* | 8/2015 | Yokoi | B60R 1/00 348/148 |

FOREIGN PATENT DOCUMENTS

JP          5454179 B2      3/2014

* cited by examiner

*Primary Examiner* — Shirley Lu
(74) *Attorney, Agent, or Firm* — Harness, Dickey & Pierce, P.L.C.

(57) ABSTRACT

A method for informing a driver of a vehicle of lane passing regulations on a road. The method includes detecting a start of a no passing zone on a road, notifying the driver of the no passing zone, detecting an end of the no passing zone, and notifying the driver that the no passing zone has ended.

20 Claims, 4 Drawing Sheets

SYSTEMS AND METHODS FOR INFORMING DRIVER OF LANE PASSING REGULATIONS

The present disclosure relates to systems and methods for informing drivers of lane passing restrictions.

BACKGROUND

This section provides background information related to the present disclosure, which is not necessarily prior art.

Systems currently exist for informing drivers of lane passing regulations on a road, such as when the driver enters a no passing zone. While such systems are suitable for their intended use, they are subject to improvement. For example, current systems fail to sufficiently inform the driver when the driver has exited the no passing zone. The present teachings provide improved systems and methods for informing drivers of lane passing regulations that address various shortcomings in the art, and provide numerous advantages, such as those set forth herein as well as other advantages that will be readily recognizable to one skilled in the art.

SUMMARY

This section provides a general summary of the disclosure, and is not a comprehensive disclosure of its full scope or all of its features.

The present teachings provide for methods and systems for informing drivers of lane passing regulations. For example, a method according to the present teachings includes the following: detecting a start of a no passing zone on a road; notifying the driver of the no passing zone; detecting an end of the no passing zone; and notifying the driver that the no passing zone has ended.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
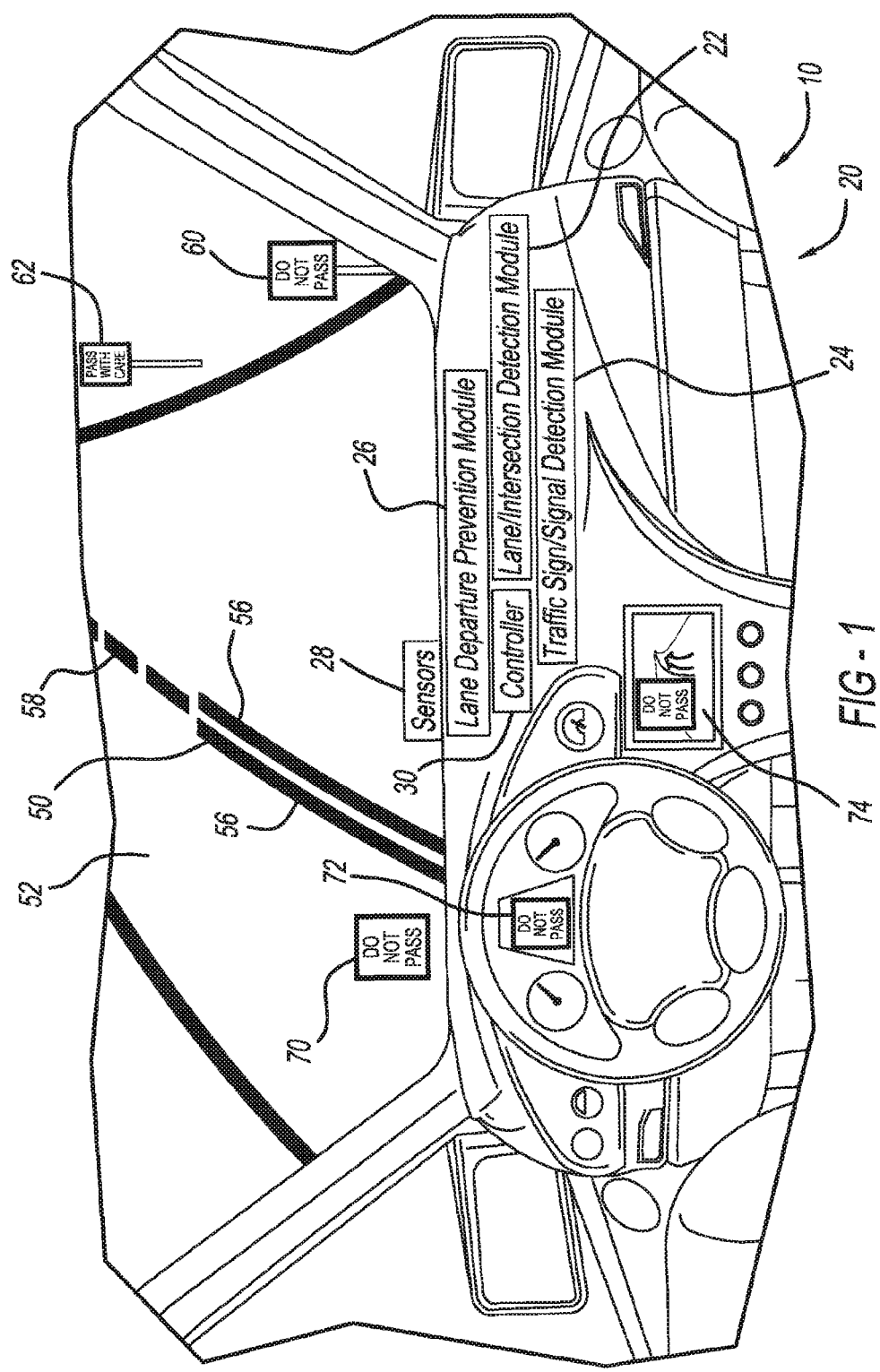
FIG. 1 illustrates a system according to the present teachings for informing a driver of a vehicle of lane passing regulations on a road.

With initial reference to FIG. 1, illustrated at reference numeral 10 is a vehicle including a system 20 according to the present teachings for informing a driver of lane passing regulations on a road. The vehicle 10 can be any suitable vehicle, such as an automobile, a sport utility vehicle (SUV), a truck, a mass transit vehicle, a military vehicle, a motorcycle, or any other suitable vehicle.

The system 20 generally includes a lane and intersection detection module 22, a traffic sign and traffic signal detection module 24, a lane departure prevention module 26, one or more sensors 28, and a controller 30. In this application, the terms "module" and "controller" may refer to, be part of, or include any suitable processor hardware (shared, dedicated, or group) that executes code, as well memory hardware (shared, dedicated, or group) that stores code executed by the processor hardware. The code is configured to provide the features of the modules and controller described herein. The controller 30 can be any suitable controller configured to control the system 20, and is thus configured to control the lane/intersection detection module 22, the traffic sign/signal detection module 24, the lane departure prevention module 26, and the sensors 28.

The lane and intersection detection module 22 is configured to detect location of a centerline 50 of road 52, as well as other markings on the road 52 that define one or more lanes of the road 52. The lane and intersection detection module 22 is further configured to detect whether the centerline 50 identifies a passing zone or a no passing zone of the road 52. For example, the lane and intersection detection module 22 is configured to identify one or more solid lines 56 of the centerline 50, which typically designate a no passing zone. FIG. 1 illustrates double solid lines 56, which identify a no passing zone for vehicles traveling in both directions on the road 52. The lane and intersection detection module 22 is further configured to detect a dashed line 58. The dashed line 58 typically represents a passing zone. A single dashed line 58 typically identifies a passing zone for vehicles traveling in both directions on the road 52. The dashed line 58 may be to the right of a solid line 56, indicating that a passing zone is present on a right side of the road 52, while a no-passing zone is at a left side of the road 52. Conversely, the dashed line 58 may be on a left side of the centerline 50, and a solid line 56 may be on a right side of the centerline 50, thereby indicating that a no-passing zone is on a right side of the road 52, and a passing zone is on a left side of the road 52. The foregoing description of the centerline 50 generally describes configuration of the centerline 50 as used in the United States for designating passing zones and no-passing zones. The lane and intersection detection module 22 can be configured in any other suitable manner to detect other configurations of the centerline 50 used to designate passing zones and no passing zones in road systems of other countries and/or jurisdictions. The lane and intersection detection module 22 is further configured to identify intersections present in the road 52 and curves in the road 52, each of which are typically designated as no passing zones.

The lane and intersection detection module 22 can be configured to detect the configuration of the centerline 50, which includes the presence of solid lines 56, dashed line 58, a curve, and/or an intersection in any suitable manner. For example, the lane and intersection detection module 22 can be configured to receive inputs from the sensors 28. The sensors 28 can include any sensors suitable for sensing the presence and location of the centerline 50, as well as solid lines 56 and dashed line 58, in any suitable manner. For example, sensors 28 can include one or more optical sensors suitable for detecting the centerline 50, as well as the solid lines 56 and dashed line 58.

The traffic sign and traffic signal detection module 24 is configured to identify traffic signs and read the traffic regulations thereon in any suitable manner. For example, the traffic sign and traffic signal detection module 24 is configured to identify traffic signs indicating the presence of a no passing zone and a passing zone. Therefore, the traffic sign and traffic signal detection module 24 is configured to identify a beginning point and an end point of a no passing zone. For example and as illustrated in FIG. 1, the traffic sign and traffic signal detection module 24 is configured to identify a traffic sign 60 indicating the start of a no passing zone. As illustrated, the traffic sign 60 reads "Do Not Pass." However, the traffic sign 60 can include any other suitable text, symbol, or illustration sufficient to identify the start of a no passing zone, and the traffic sign and traffic signal detection module 24 is configured to read such a sign and identify the sign as signaling the start of a no passing zone.

The traffic sign and traffic signal detection module 24 is further configured to identify and read traffic sign 62, which identifies the start of a passing zone, and thus also identifies an end of a no passing zone. As illustrated, the traffic sign 62 reads "Pass With Care," however, the traffic sign 62 can include any other text, drawing, illustration, or symbol identifying a passing zone. The traffic sign and traffic signal detection module 24 is further configured to detect the presence of traffic signals, which are typically present only in no passing zones.

The traffic sign and traffic signal detection module 24 is configured to identify and read the traffic signs 60 and 62, and identify traffic signals, in any suitable manner. For example, the traffic sign and traffic signal detection module 24 is configured to receive inputs from the sensors 28. The sensors 28 can include optical sensors, or any other suitable sensors, configured to identify and read the traffic signs 60 and 62, as well as identify traffic signals.

The lane departure prevention module 26 is configured to identify the location of the centerline 50, and control the vehicle 10, in any suitable manner to guide the vehicle 10 away from the centerline 50 to prevent the vehicle 10 from crossing the centerline 50 when the vehicle 10 is within a no passing zone. The lane departure prevention module 26 can guide the vehicle 10 in any suitable manner. For example, the lane departure prevention module 26 can steer the vehicle 10 away from the centerline 50 to maintain the vehicle 10 in its current lane, activate braking at select wheels of the vehicle 10 in a manner that will guide the vehicle 10 away from the centerline 50, decelerate the vehicle 10, such as by cutting the vehicle's throttle, and control the vehicle 10 in any other suitable manner to guide the vehicle 10 away from the centerline 50 in an effort to prevent the vehicle 10 from crossing the centerline 50.

Figure 2:
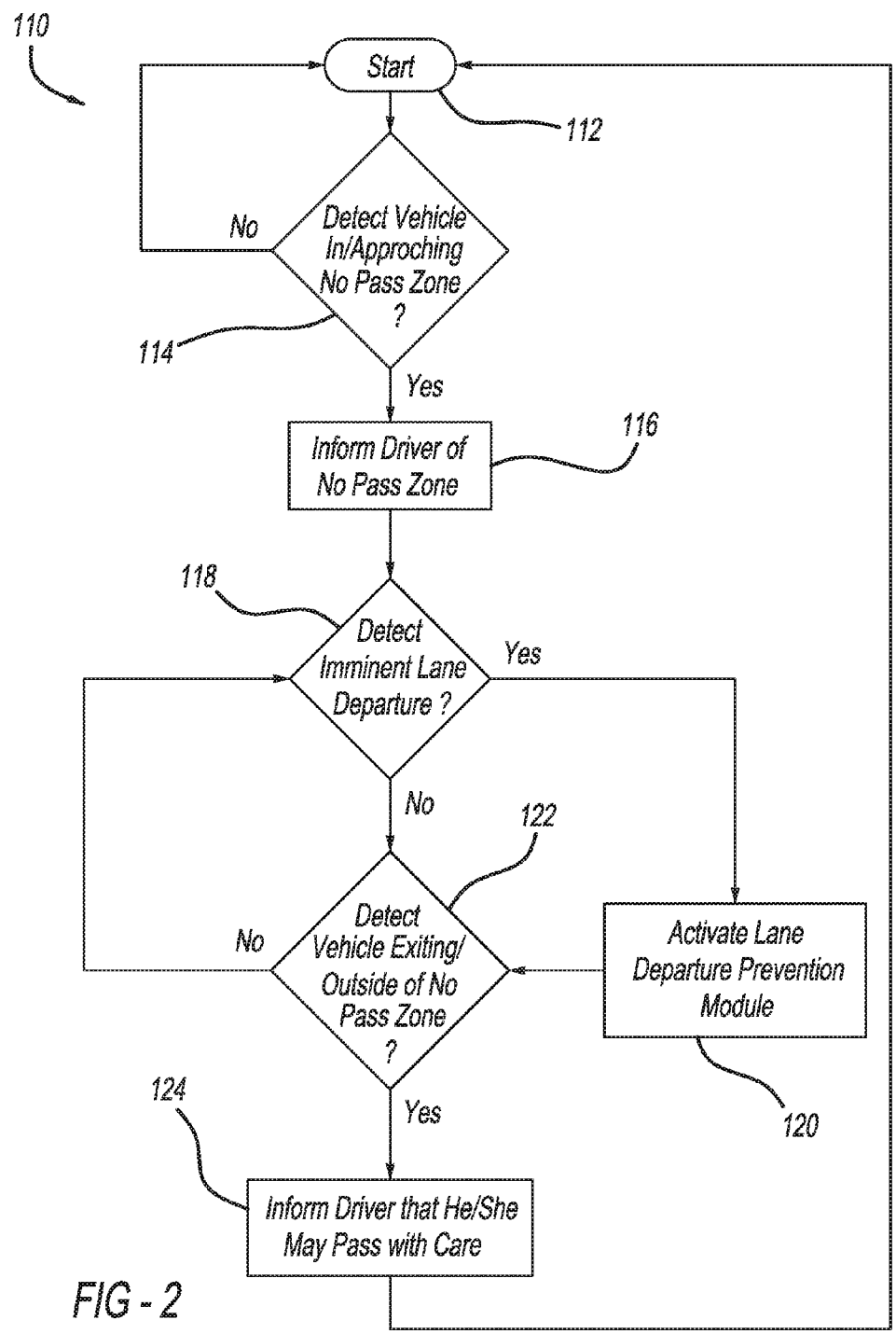
FIG. 2 illustrates a method according to the present teachings for informing a driver of a vehicle of lane passing regulations.

With continued reference to FIG. 1, and additional reference to FIG. 2, FIG. 2 illustrates a method according to the present teachings at reference numeral 110 for informing a driver of the vehicle 10 of lane passing regulations. From start block 112, the method 110 proceeds to block 114 where the lane and intersection detection module 22, and the traffic sign and traffic signal detection module 24, detect whether the vehicle 10 is in or approaching a no passing zone. If the vehicle 10 is not in or approaching a no passing zone at block 114, the method 110 returns to start block 112. If at block 114 the lane and intersection detection module 22 and/or the traffic sign and traffic signal detection module 24 determine that the vehicle 10 is in or approaching a no passing zone, the method 110 proceeds to block 116.

At block 116, the controller 30 informs the driver of the vehicle 10 of the no passing zone in any suitable manner. For example and as illustrated in FIG. 1, a heads-up display (HUD) 70 can be used to inform the driver of the no passing zone in any suitable manner. For example, the HUD 70 can display a graphic of a traffic sign identifying a no passing zone, such as a graphic including the text "Do Not Pass." The controller 30 can inform the driver of the vehicle 10 of the no passing zone in any other suitable manner as well. For example, an instrument cluster display 72 can display the "Do Not Pass" graphic, or any other suitable indication to the driver. Similarly, a center console display 74 can display the "Do Not Pass" graphic or can inform the driver of the no passing zone in any other suitable manner.

The controller 30 can inform the driver of the no passing zone at block 116 at any suitable time. For example, the controller 30 can inform the driver of the no passing zone immediately upon detection of the no passing zone, just before the vehicle 10 reaches the no passing zone, as the vehicle 10 enters the no passing zone, or just after the vehicle 10 has entered the no passing zone.

Figure 3:
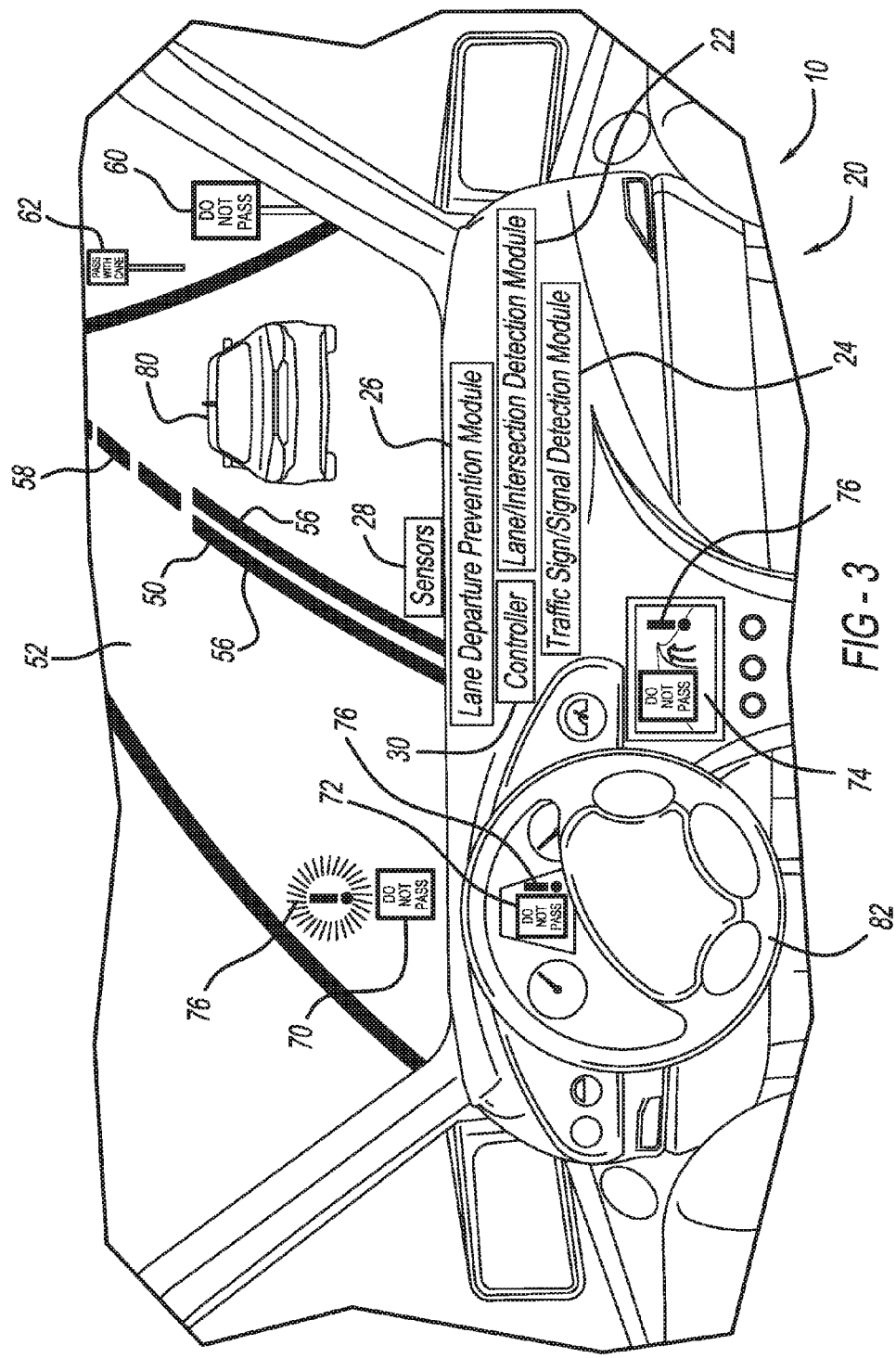
FIG. 3 illustrates the system of FIG. 1 in a vehicle about to cross a centerline while the vehicle is in a no passing zone.

At block 118, the lane departure prevention module 26 determines whether or not the vehicle 10 is about to cross the centerline 50, such as to pass lead vehicle 80 of FIG. 3, and thus depart from its current lane while still inside a no passing zone. The lane departure prevention module 26 is configured to determine whether or not departure from the current lane is imminent in any suitable manner. For example, the lane departure prevention module 26 can be in receipt of images of the road 52 captured by the sensors 28, such as by one or more cameras of the sensors 28. If based on inputs from the sensors 28 the lane departure prevention module 26 determines that the vehicle 10 is about to depart from its current lane and cross the centerline 50, for example, at block 120 the lane departure prevention module 26 is activated in order to keep the vehicle 10 in its current lane and prevent the vehicle 10 from crossing the centerline 50. The lane departure prevention module 26 is configured to keep the vehicle 10 in its current lane in any suitable manner. For example, the lane departure prevention module 26 is configured to steer the vehicle 10 away from the centerline 50, selectively brake wheels of the vehicle 10 in order to guide the vehicle 10 away from the centerline 50, decelerate the vehicle 10 in a manner to guide the vehicle away from the centerline 50, or control the vehicle 10 in any other suitable manner. As illustrated in FIG. 3, when the lane departure prevention module 26 determines that departure from the current lane is imminent, the controller 30 can generate any suitable alert, such as visual alert 76 to the driver on at least one of the HUD 70 or displays within the passenger cabin, such as the instrument cluster display 72 or the center counsel display 74.

Figure 4:
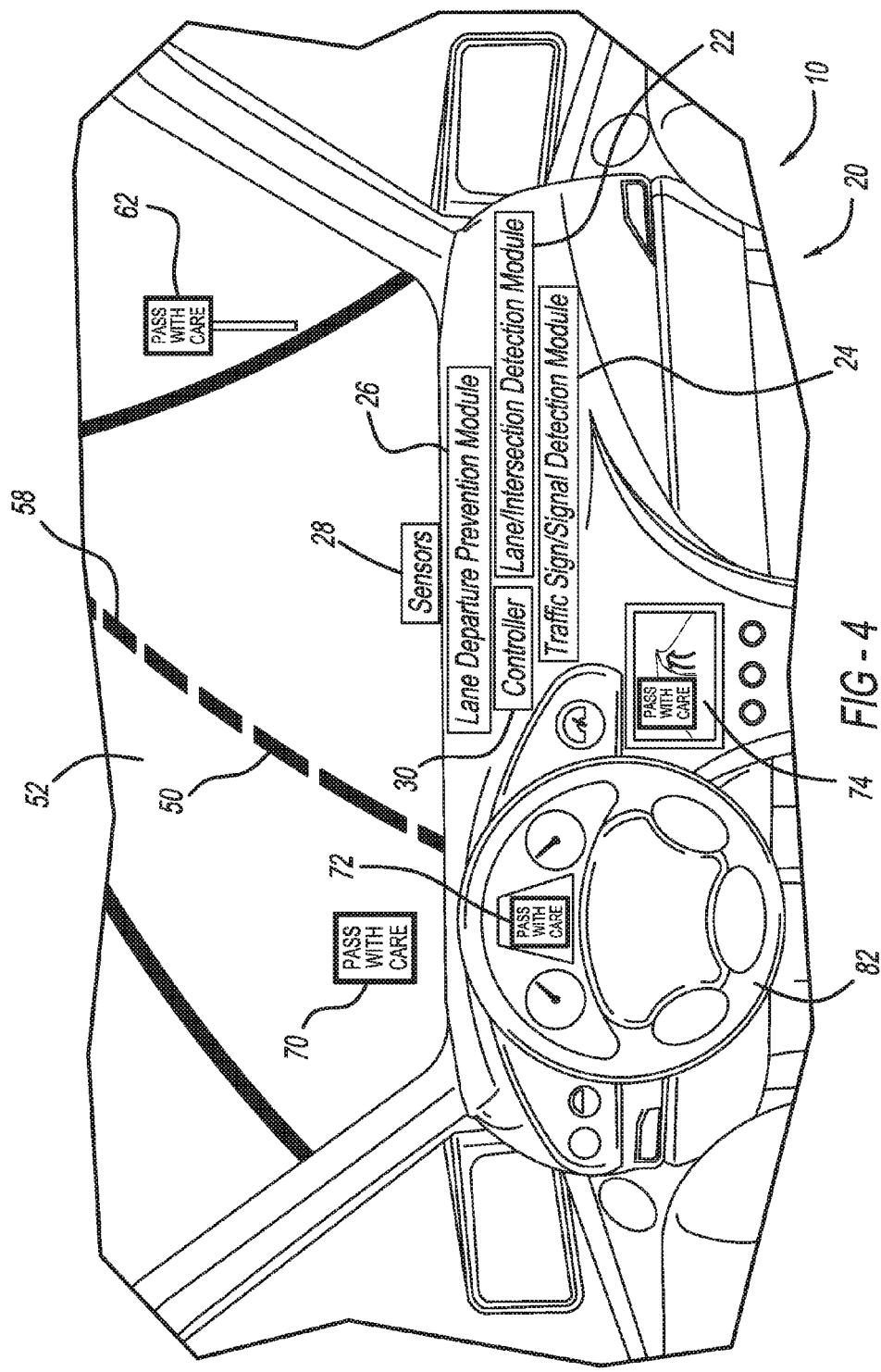
FIG. 4 illustrates the system of FIG. 1 in a vehicle that has exited a no-passing zone and entered a passing zone.

After blocks 118 and 120, the method 110 proceeds to block 122. As illustrated in FIG. 2, the system 110 may proceed to block 122 directly from block 118 when imminent lane departure is not detected, or subsequent to block 120. At block 122 the traffic sign and traffic signal detection module 24 and the lane and intersection detection module 22 determine whether the vehicle 10 has exited the no-passing zone. Whether or not the vehicle 10 has exited the no passing zone can be determined in any suitable manner. For example, the vehicle 10 will be determined to have exited the no passing zone when the traffic sign and traffic signal detection module 24 identifies a traffic sign indicating that the no passing zone has ended, such as by detecting the "Pass With Care" traffic sign 62. The vehicle 10 will also be determined to have exited the no-passing zone if the lane and intersection detection module 22 detects a change in configuration of the centerline 50 from solid line 56 on the right side of the centerline 50 to a dashed line 58 on the right side of the centerline 50, or a single dashed line 58 as illustrated in FIGS. 1, 3, and 4.

After detecting that the vehicle 10 has exited, or is about to exit, the no passing zone at block 122, the method 110 proceeds to block 124. At block 124 the controller 30 informs the driver that he or she may pass vehicles ahead of the vehicle 10. The controller 30 may inform the driver that he or she may pass in any suitable manner. For example and as illustrated in FIG. 4, the heads up display 70 may display a suitable graphic, such as a "Pass With Care" graphic. The instrument cluster display 72 and the center console display 74 may also illustrate any suitable graphic, such as the "Pass With Care" graphic illustrated in FIG. 4.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for informing a driver of a vehicle of lane passing regulations on a road comprising:
   detecting a start of a no passing zone on a road with at least one of:
      a traffic sign detection module configured to detect traffic signs posting lane passing regulations; and
      a lane detection module configured to detect location of a road center line, and whether the road center line identifies a passing zone or a no passing zone;
   notifying the driver of the start of the no passing zone with an alert system configured to alert the driver of the start of the no passing zone and the end of the no passing zone;
   detecting an end of the no passing zone with at least one of the traffic sign detection module and the lane detection module; and
   notifying the driver that the no passing zone has ended using the alert system;
   wherein a controller is configured to activate the alert system to notify the driver of the start of, and the end of, the no passing zone.

2. The method of claim 1, further comprising notifying the driver of the no passing zone as the vehicle enters the no passing zone.

3. The method of claim 1, further comprising notifying the driver of the no passing zone prior to the vehicle entering the no passing zone.

4. The method of claim 1, further comprising notifying the driver of the no passing zone after the vehicle has entered the no passing zone.

5. The method of claim 1, further comprising detecting that the vehicle is about to cross, or has crossed, a center line of the road; and alerting the driver that the vehicle is about to impermissibly cross, or has impermissibly crossed, the center line while the vehicle is in the no passing zone.

6. The method of claim 5, further comprising controlling the vehicle to prevent the vehicle from crossing the center line while the vehicle is in the no passing zone.

7. The method of claim 6, further comprising controlling the vehicle with a vehicle lane departure prevention module to prevent the vehicle from crossing the center line while the vehicle is in the no passing zone.

8. The method of claim 1, further comprising detecting the start of the no passing zone by detecting a traffic sign identifying the start of the no passing zone.

9. The method of claim 1, further comprising detecting the start of the no passing zone by detecting a lane marker configured to identify the start of the no passing zone.

10. The method of claim 1, further comprising detecting the end of the no passing zone by detecting a traffic sign identifying the end of the no passing zone.

11. The method of claim 1, further comprising detecting the end of the no passing zone by detecting a lane marker configured to identify the end of the no passing zone.

12. The method of claim 1, further comprising detecting presence of the no passing zone by detecting at least one of a traffic light, an intersection, and a curve in the road.

13. A system for informing a driver of a vehicle of lane passing regulations on a road comprising:
   a traffic sign detection module configured to detect traffic signs posting lane passing regulations;
   a lane detection module configured to detect location of a road center line, and whether the road center line identifies a passing zone or a no passing zone;
   a lane departure prevention module configured to control the vehicle to prevent the vehicle from crossing the road center line while the vehicle is in the no passing zone;
   an alert system configured to alert the driver of the start of the no passing zone and the end of the no passing zone; and
   a controller configured to activate the alert system to alert the driver of the start of the no passing zone and the end of the no passing zone.

14. The system of claim 13, wherein the traffic sign detection module is configured to detect traffic signs identifying start and end of the passing zone using at least one sensor, the at least one sensor includes at least one camera.

15. The system of claim 13, wherein the lane detection module is configured to detect whether the road center line identifies a passing zone or a no passing zone using at least one sensor, the at least one sensor includes at least one camera.

16. The system of claim 13, wherein the controller is configured to activate the alert system to alert the driver of the start of the no passing zone as the vehicle enters the no passing zone.

17. The system of claim 13, wherein the controller is configured to activate the alert system to alert the driver of the start of the no passing zone before the vehicle enters the no passing zone.

18. The system of claim 13, wherein the controller is configured to activate the alert system to alert the driver of the no passing zone after the vehicle enters the no passing zone.

19. The system of claim 13, wherein the controller is configured to activate the alert system to alert the driver of the end of the no passing zone when the lane detection module detects that the road center lane is configured to identify a passing zone.

20. The system of claim 13, wherein the controller is configured to activate the alert system to alert the driver of the no passing zone at least one of when the lane detection module identifies a curb in the road, the lane detection module detects a road intersection, and a traffic signal detection module detects a traffic signal.

* * * * *